United States Patent
Xia et al.

(10) Patent No.: US 8,923,698 B2
(45) Date of Patent: Dec. 30, 2014

(54) SPECTRUM EFFICIENT OPTICAL TRANSPORT SYSTEM WITH SUPERCHANNELS

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 142 days.

(21) Appl. No.: 13/525,792

(22) Filed: Jun. 18, 2012

(65) Prior Publication Data

US 2013/0336658 A1 Dec. 19, 2013

(51) Int. Cl.
*H04J 14/02* (2006.01)

(52) U.S. Cl.
USPC ................................................ 398/83

(58) Field of Classification Search
CPC .. H04J 14/021; H04J 14/0211; H04J 14/0224
See application file for complete search history.

(56) References Cited

U.S. PATENT DOCUMENTS

| | | | | |
|---|---|---|---|---|
| 2004/0208522 A1* | 10/2004 | Dawes et al. | .................. | 398/31 |
| 2009/0290873 A1* | 11/2009 | Takita et al. | .................. | 398/59 |
| 2009/0297142 A1* | 12/2009 | Szafraniec et al. | ............. | 398/25 |
| 2010/0260500 A1* | 10/2010 | Ji et al. | ............................ | 398/50 |
| 2011/0293279 A1* | 12/2011 | Lam et al. | ....................... | 398/79 |
| 2012/0189301 A1* | 7/2012 | Ghiggino et al. | ............... | 398/34 |

OTHER PUBLICATIONS

Antosik, Super-Channel Architectures for In-Service Capacity Expansion of CWDM/DWDM Systems (Published in Proceedings of 5th International Conference on Transparent Optical Networks, 2003, vol. 2, Jul. 2003).*

Huang et al, Transmission of Spectral Efficient Super-Channels Using All-Optical OFDM and Digital Coherent Receiver Technologies (Published in Journal of Lightwave Technology, vol. 29, Issue: 24, Dec. 2011).*

* cited by examiner

*Primary Examiner* — David Payne
*Assistant Examiner* — Casey Kretzer (57) ABSTRACT

A method, performed by a computer device, may include determining that an available spectrum, associated with an optically switched light path, has been allocated for one or more superchannels and identifying a leftover spectrum, associated with the one or more superchannels allocated for the optically switched light path. The method may further include selecting a use for the leftover spectrum; selecting one or more devices to configure based on the selected use; configuring the selected one or more devices to use the leftover spectrum; and sending data via the leftover spectrum using the configured one or more devices.

20 Claims, 11 Drawing Sheets

SPECTRUM EFFICIENT OPTICAL TRANSPORT SYSTEM WITH SUPERCHANNELS

BACKGROUND INFORMATION

An optical network may include optical fibers, which provide light path channels between devices of the network. A channel may originate at a first device, may pass through one or more intermediary devices, and may terminate at a second device. The one or more intermediary devices may switch the light path of the channel from one optical fiber to another optical fiber using a device such as an optical add-drop multiplexer (OADM). Multiple channels may be combined onto an optical fiber using wavelength division multiplexing (WDM). In WDM, each channel may be associated with a different wavelength band. Since an optical fiber has a limited bandwidth, efficient use of the bandwidth for allocating channels in an optical fiber is highly desirable.

DETAILED DESCRIPTION OF PREFERRED EMBODIMENTS

The following detailed description refers to the accompanying drawings. The same reference numbers in different drawings identify the same or similar elements.

An implementation described herein relates to a spectrum efficient optical transport system with superchannels. An optical transport system, such as a Dense Wavelength Division Multiplexing (DWDM) network, may use channels of a fixed spectral width, which may enable the optical transport system to divide up an optical spectrum in an optical fiber into channels of a particular spectral width. For example, a 100 Gigabit/second (100 G) optical transport system may use a 50 Gigahertz (GHz) spectral width for channels. When channel speed exceeds 100 G, the channel structure may include superchannels. The term "superchannel" refers to a channel that includes multiple optical carriers. For example, a superchannel may include phase-locked carriers with independent modulation that overlap in frequency and are encoded using orthogonal frequency-division multiplexing (OFDM). An optical system that uses superchannels may be more spectrally efficient, because superchannels may allow optical carriers to be packed more tightly in the available optical spectrum.

In order to simplify network management, the spectral width of superchannels may be of a fixed spectral granularity times an integer. For example, the spectral granularity may correspond to 50 GHz and the spectral width of a superchannel may correspond to 50 GHz, 100 GHz, 150 GHz, etc. The use of superchannels with a fixed spectral granularity times an integer may result in a spectral gap between the available bandwidth, of an optically switched light path in an optical fiber, and the spectral width of a superchannel, which may result in a leftover spectrum in a light path.

An implementation described herein relates to using a leftover spectrum of available bandwidth in an optically switched light path in an optical system that uses superchannels. The leftover spectrum may be identified based on allocation of one or more superchannels for an available spectrum of the optically switched light path. A use for the leftover spectrum may be selected and equipment may be selected and configured based on the selected use. As an example, the leftover spectrum may be used as a data channel associated with a particular technology, such as an OFDM data channel. As another example, the leftover spectrum may be used as a network management channel that transmits network management messages and/or control plane messages.

As yet another example, multiple leftover spectra may exist in a light path that includes multiple superchannels. Each allocated superchannel may include an associated leftover spectrum of the available bandwidth in the light path. The multiple leftover spectra may be used in connection with a flexible channel that distributes signals into the multiple leftover spectra.

In some implementations, the use of the leftover spectrum, of the available bandwidth in an optically switched light path, may be flexible and/or adaptive. For example, the width of a carrier in a superchannel may change, the number of carriers in a superchannel may change, the bandwidth of a superchannel may change, and/or the number of superchannels in a light path may change. When a change in the light path configuration is detected, the use of the leftover spectrum may be adapted based on the detected change.

Figure 1:
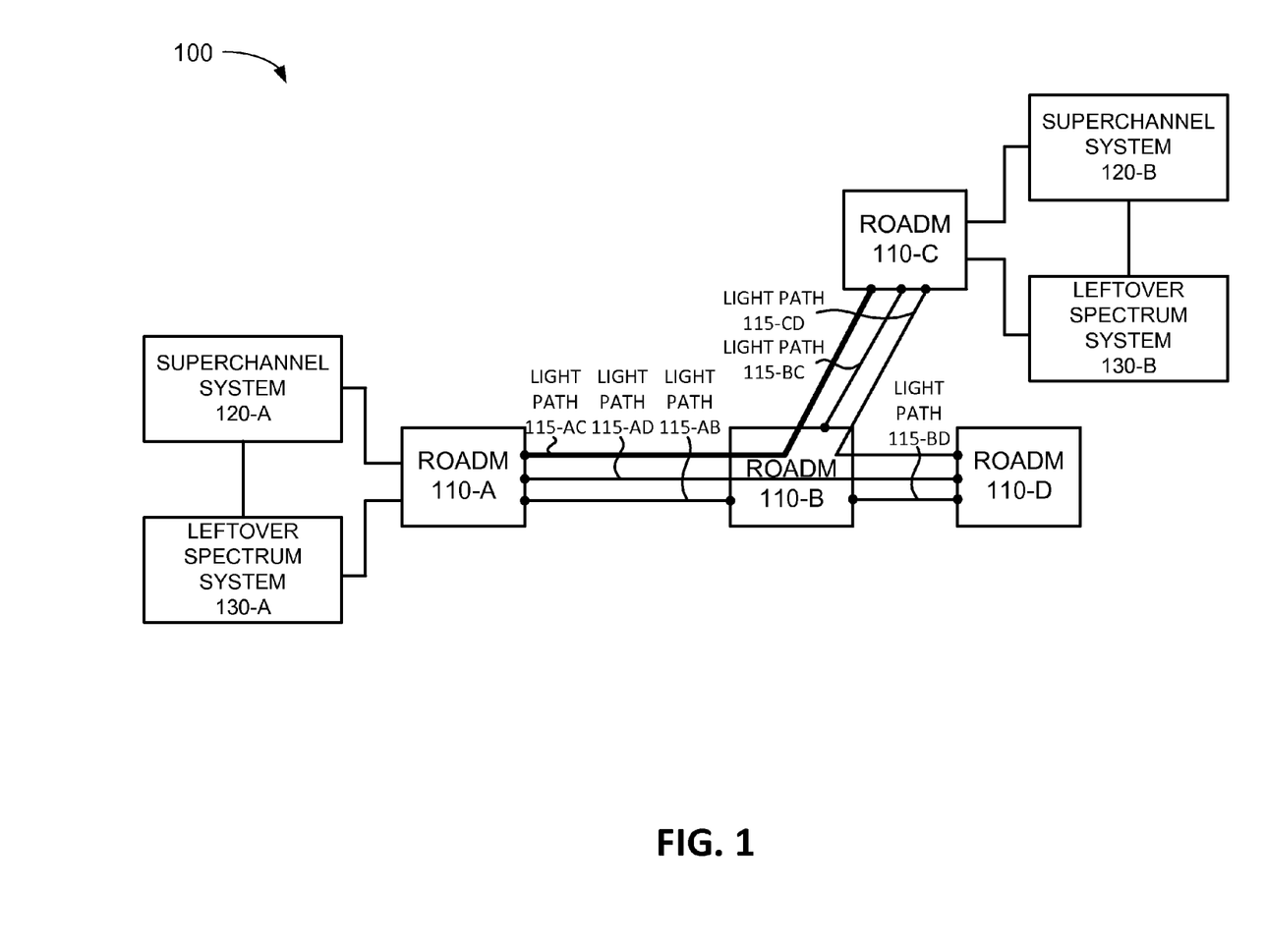
FIG. 1 is a diagram illustrating an exemplary system according to an implementation described herein.

FIG. 1 is a diagram of an exemplary system 100 according to an implementation described herein. As shown in FIG. 1, system 100 may include reconfigurable optical add-drop multiplexers (ROADMs) 110-A through 110-D (referred to herein collectively as "ROADMs 110" and individually as "ROADM 110"), superchannel systems 120-A and 120-B (referred to herein collectively as "superchannel systems 120" and individually as "superchannel system 120"), and leftover spectrum systems 130-A and 130-B (referred to herein collectively as "leftover spectrum systems 130" and individually as "leftover spectrum system 130"). While FIG. 1 shows system 100 with a particular number of ROADMs 110, superchannel systems 120, and leftover spectrum systems 130 for illustrative purposes, in practice, system 100 may include a different number of ROADMs 110, superchannel systems 120, and/or leftover spectrum systems 130.

ROADM 110 may include one or more devices configured to multiplex and/or route light channels into or out of an optical fiber. ROADM 110 may include light paths to other ROADMs 110. For example, ROADM 110-A may be connected to ROADM 110-B via light path 115-AB, to ROADM 110-C via light path 115-AC, and to ROADM 110-D via light path 115-AD. ROADM 110-B may be connected to ROADM 110-C via light path 115-BC and to ROADM 110-D via light path 115-BD. ROADM 110-C may be connected to ROADM 110-D via light path 115-CD. Thus, ROADMs 110 may form an interconnected mesh of light paths 115.

ROADM 110 may be remotely reconfigurable. ROADM 110 may include colorless functionality. Colorless functionality may enable ROADM 110 to assign any wavelength (i.e., color) to any port. ROADM 110 may include directionless functionality. Directionless functionality may enable ROADM 110 to route any wavelength in any direction served by ROADM 110. ROADM 110 may include contentionless functionality. When two wavelengths of the same color arrive at the same switching structure in ROADM 110, network contention may result. Contentionless functionality may enable ROADM 110 to receive multiple copies of the same wavelength at the same switching, add, and/or drop structure. ROADM 110 may include gridless functionality. Gridless functionality may enable ROADM 110 to use adaptive channel widths that do not depend on the channel width of a particular optical network grid, such as a channel width specified by an International Telecommunications Union (ITU) standard.

Superchannel system 120 may include one or more devices that generate a superchannel and/or that retrieve signals from a superchannel. For example, superchannel system 120 may convert electrical signals into optical signals, and/or may receive optical signals from another device (not shown in FIG. 1), and may encode the optical signals into a superchannel optical signal. Superchannel system 120 may provide the superchannel optical signal to ROADM 110. As another example, superchannel system, 120 may receive a superchannel optical signal from ROADM 110 and may decode the optical signal from the superchannel. Superchannel system 120 may provide a decoded optical signal to another device (not shown in FIG. 1), may convert a decoded optical signal into an electrical signal, and/or may perform other processing on the decoded optical signal.

Leftover spectrum system 130 may include one or more devices that select a use for a leftover spectrum, of an available bandwidth in an optically switched light path and resulting from an allocation of the available bandwidth for one or more superchannels, and may configure equipment for the selected use. In one implementation, leftover spectrum system 130 may obtain information relating to superchannel allocation, associated with a particular light path, from superchannel system 120. In another implementation, leftover spectrum system 130 may monitor ROADM 110 to determine superchannel allocation associated with a particular light path.

As an example, superchannel system 120-A may configure ROADM 110-A to receive a superchannel (e.g., a range of wavelengths associated with the superchannel) from superchannel system 120-A via a particular port and add the superchannel to light path 115-AC. ROADM 110-B may be configured to route light path 115-AC from ROADM 110-A to ROADM 110-C. Superchannel system 120-A may further configure ROADM 110-C to provide the superchannel to superchannel system 120-B. Leftover spectrum system 130-A may configure ROADM 110-A to receive an optical channel (e.g., a range of wavelengths associated with the optical channel), such as a data channel, a network management channel, and/or a flexible distributed channel, from leftover spectrum system 130-A via a particular port and add the optical channel to the leftover spectrum of light path 115-AC. Leftover spectrum system 130-B may further configure ROADM 110-C to provide the optical channel to leftover spectrum system 130-B. If the superchannel allocation changes, resulting in a change in the leftover spectrum, leftover spectrum system 130-A may reconfigure the optical channel based on the change in the leftover spectrum. For example, leftover spectrum system 130-A may increase or decrease a bandwidth associated with the optical channel.

Although FIG. 1 shows exemplary components of system 100, in other implementations, system 100 may include fewer components, different components, differently arranged components, or additional components than depicted in FIG. 1. Additionally or alternatively, one or more components of system 100 may perform functions described as being performed by one or more other components of system 100.

Figure 2:
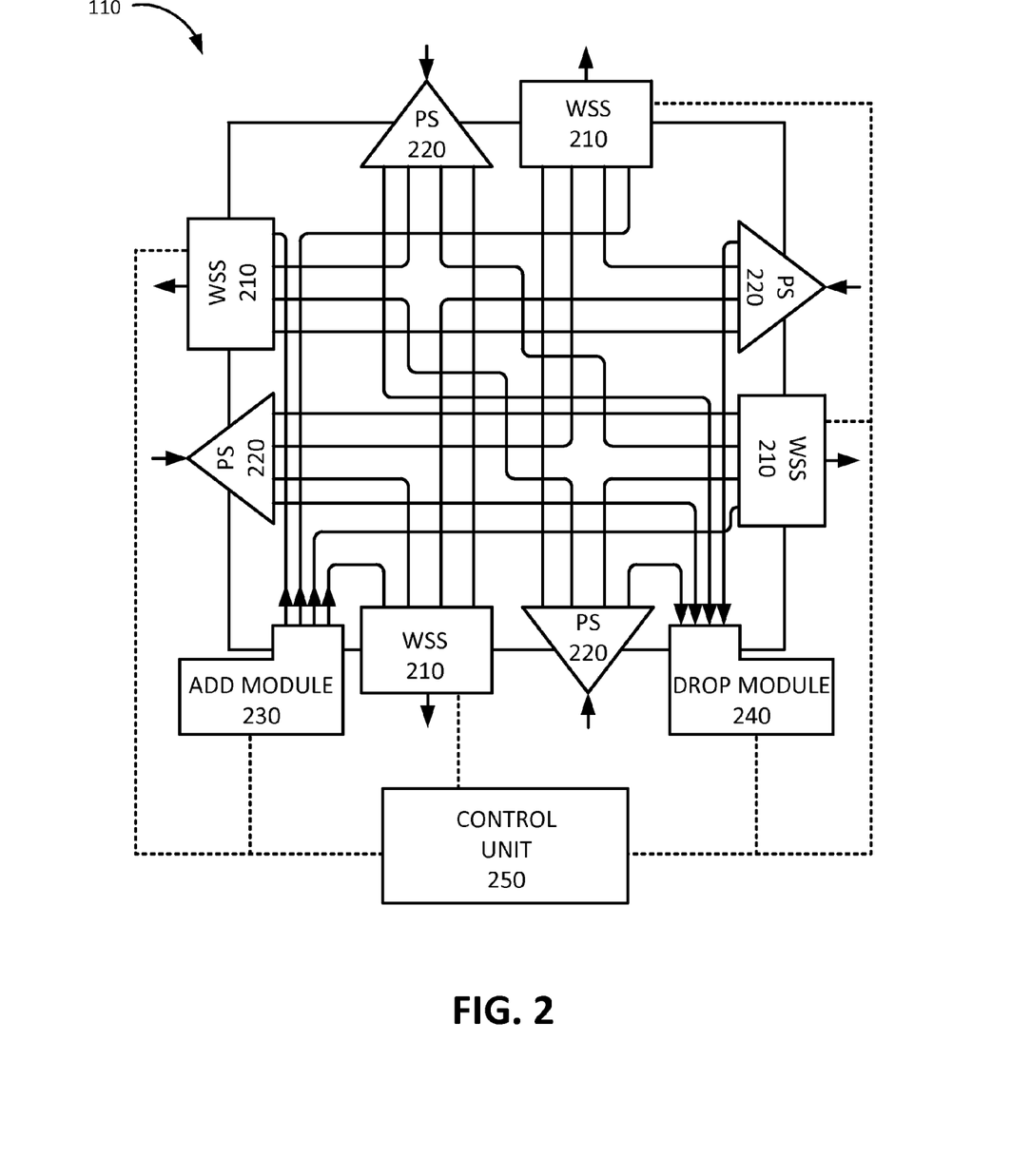
FIG. 2 is a diagram illustrating exemplary components of a reconfigurable optical add-drop multiplexer of FIG. 1.

FIG. 2 is a diagram illustrating exemplary components of ROADM 110 of FIG. 1. As shown in FIG. 2, ROADM 110 may include one or more wavelength selective switches (WSS) 210 (referred to herein collectively as "WSSes 210" and individually as "WSS 210"), one or more power splitters (PS) 220 (referred to herein collectively as "PSes 220" and individually as "PS 220"), an add module 230, a drop module 240, and a control unit 250. While FIG. 2 illustrates a particular number of WSSes 210 and PSes 220, a single add module 230, and a single drop module 240 for illustrative purposes, in practice, ROADM 110 may include a different number of WSSes 210, PSes 220, add modules 230, and/or drop modules 240. For example, FIG. 2 illustrates ROADM 110 that receives optical signals from four directions and that transmits optical signals in four directions. In another example, ROADM 110 may receive and transmit optical signals in a different number of directions.

WSS 210 may select a particular wavelength, or range of wavelengths, from a first optical fiber for transmission onto a second optical fiber. For example, WSS 210 may receive the first optical fiber from a PSS 220 or add module 230, may select an optical signal in a particular range of wavelength from the first optical fiber, and may divert the selected optical signal onto a second optical fiber that may connect to a remote ROADM 110 (or another type of device). In one implementation, WSS 210 may be implemented as an array of microelectromechanical system (MEMS) mirrors. In another implementation, WSS 210 may be implemented as a liquid crystal on Silicon (LCoS) system. In yet another implementation, WSS 210 may be implemented as a Liquid Crystal (LC) system. In yet another implementation, WSS 210 may be implemented as another type of system.

PS 220 may split an optical signal from a first optical fiber into multiple optical signals. For example, PS 220 may provide a received optical signal to WSSes 210 in ROADM 110 associated with other directions and/or may provide the received optical signal to drop module 240. Add module 230 may receive an optical signal in a particular range of wavelengths from another device (not shown in FIG. 2) and may add the optical signal to a particular WSS 210. Drop module 240 may receive an optical signal in a particular range of wavelengths from a particular PS 220 and may provide the optical signal to another device (not shown in FIG. 2).

Control module 250 may control WSSes 210, add module 230, and/or drop module 240. For example, control module 250 may configure WSS 210 to select a particular range of wavelengths from a particular direction (e.g., from a PS 220 associated with another direction), may configure add module 230 to add an optical signal in a particular range of wavelengths to a particular WSS 210, and/or may configure drop module 240 to receive an optical signal in a particular range of wavelengths from a particular PS 220.

Although FIG. 2 shows exemplary components of ROADM 110, in other implementations, ROADM 110 may include fewer components, different components, additional components, or differently arranged components than depicted in FIG. 2. Additionally or alternatively, one or more components of ROADM 110 may perform one or more tasks described as being performed by one or more other components of ROADM 110.

Figure 3:
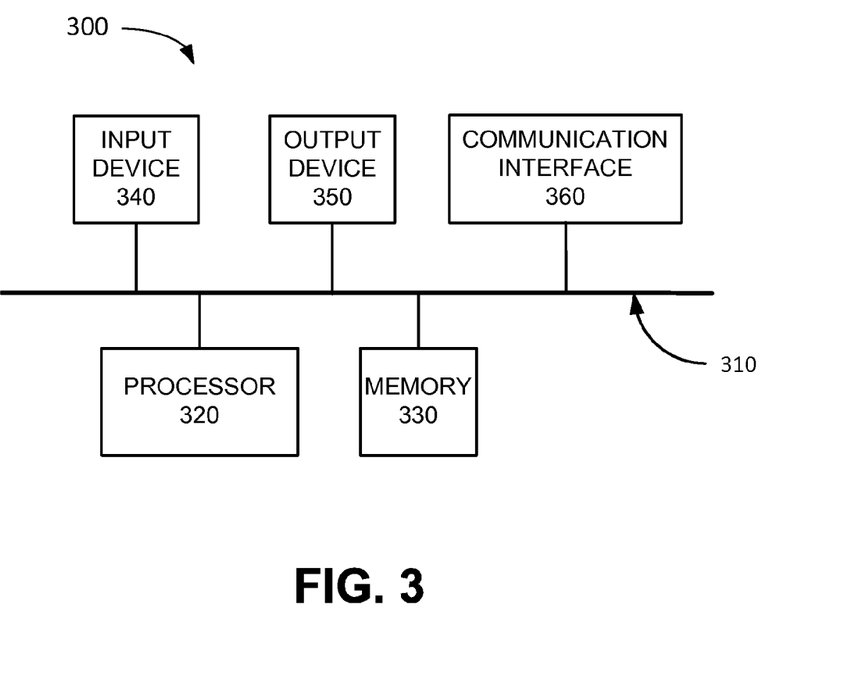
FIG. 3 is a diagram illustrating exemplary components of a device that may be included in one or more components of FIG. 1.

FIG. 3 is a diagram illustrating exemplary components of a device 300 according to an implementation described herein. Superchannel system 120, leftover spectrum system 130, and/or control module 250 of ROADM 110 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to selecting a use for a leftover spectrum, of an available bandwidth in an optically switched light path and resulting from allocation of one or more superchannels for the available bandwidth, and relating to configuring equipment for the selected use. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
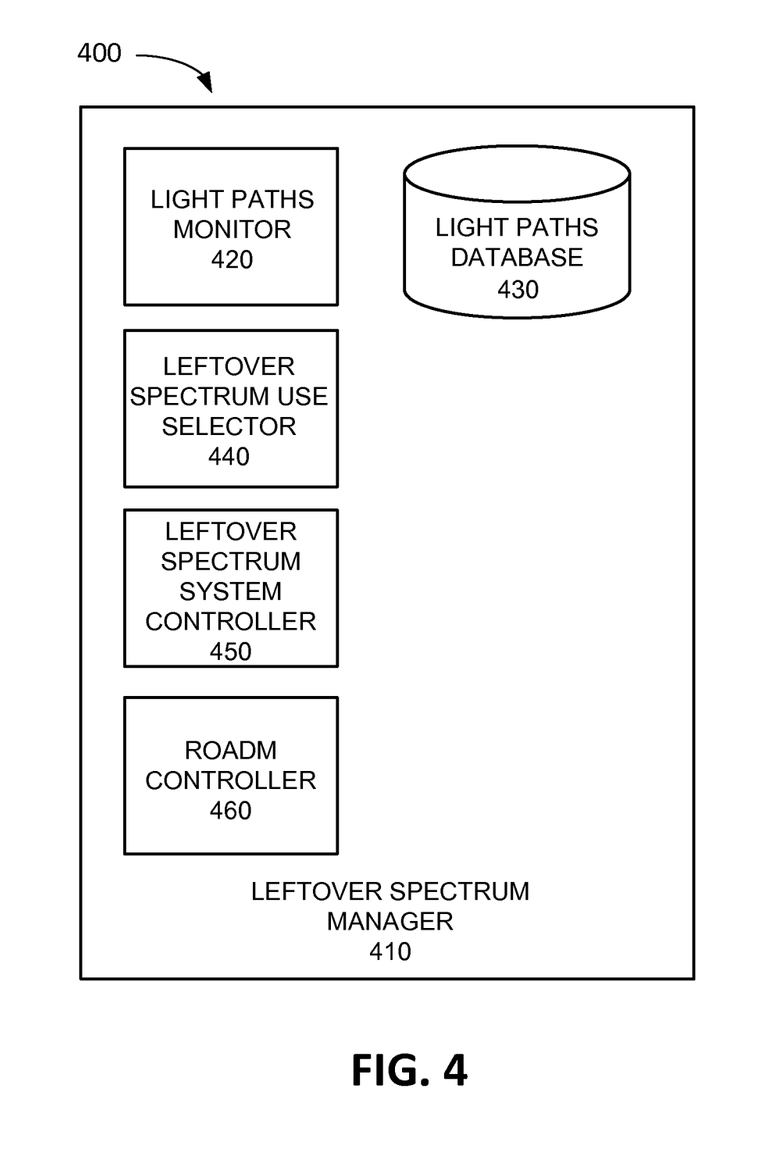
FIG. 4 is a diagram illustrating exemplary functional components of a device that may be included in one or more components of FIG. 1.

FIG. 4 is a diagram of exemplary functional components of functional device 400. Leftover spectrum system 130 and/or ROADM 110 may include functional device 400. Functional device 400 may be implemented, for example, via processor 320 executing instructions from memory 330. Alternatively, some or all of the functional components of leftover spectrum system 130 may be hardwired. As shown in FIG. 4, functional device 400 may include a leftover spectrum manager 410. Leftover spectrum manager 410 may select a use for a leftover spectrum resulting from superchannel allocation and may configure equipment for the selected use. Leftover spectrum manager 410 may include a light paths monitor 420, a light paths database 430, a leftover spectrum use selector 440, a leftover spectrum system controller 450, and a ROADM controller 460.

Light paths monitor 420 may monitor light paths associated with a ROADM associated with leftover spectrum system 130. For example, light paths monitor 420 of leftover spectrum system 130-A may monitor light paths associated with ROADM 110-A. Light paths monitor 420 may monitor superchannel allocation associated with a particular light path and may determine a leftover spectrum associated with the superchannel allocation. Light paths database 430 may store information relating to superchannel allocation associated with particular light paths and/or may store information relating to leftover spectrums associated with the particular light paths.

Leftover spectrum use selector 440 may select a particular use for the leftover spectrum. For example, leftover spectrum selector 440 may select the particular use based on equipment associated with leftover spectrum system 130. If the equipment associated with leftover spectrum system 130 is associated with different types of equipment, leftover spectrum selector 440 may select the particular use based on one or more other criteria. For example, leftover spectrum use selector 440 may select a use for the leftover spectrum based on a particular type of superchannel allocation. For example, if multiple superchannels have been allocated and each superchannel is associated with a leftover spectrum, leftover spectrum use selector 440 may select to use a flexible channel with a distributed spectral arrangement to utilize the multiple leftover spectra.

Leftover spectrum system controller 450 may configure leftover spectrum system 130 based on the selected use for the selected spectrum. For example, if leftover spectrum use selector 440 has selected that a particular data channel is to be transmitted via the leftover spectrum, leftover spectrum system controller 450 may configure leftover spectrum system 130 to receive (or generate) the data channel and convert the data channel to an optical signal at a wavelength range associated with the leftover spectrum. As another example, if leftover spectrum use selector 440 has selected that a network management channel is to be transmitted via the leftover spectrum, leftover spectrum system controller 450 may configure leftover spectrum system 130 to receive (or generate) the network management channel and convert the network management channel to an optical signal at a wavelength range associated with the leftover spectrum.

ROADM controller 460 may configure one or more ROADMs 110 based on the selected use for the leftover spectrum. For example, ROADM controller 460 may configure add module 230 and WSS 210 of a first ROADM 110 to add an optical signal at a wavelength range associated with the leftover spectrum onto a light path associated with the leftover spectrum and may configure drop module 240 of a second ROADM 110 to drop the optical signal at the end of the light path.

Although FIG. 4 shows exemplary functional components of leftover spectrum system 130, in other implementations, leftover spectrum system 130 may include fewer functional components, different functional components, differently arranged functional components, or additional functional components than depicted in FIG. 4. Additionally or alternatively, one or more functional components of leftover spectrum system 130 may perform functions described as being performed by one or more other functional components of leftover spectrum system 130.

Figure 5:
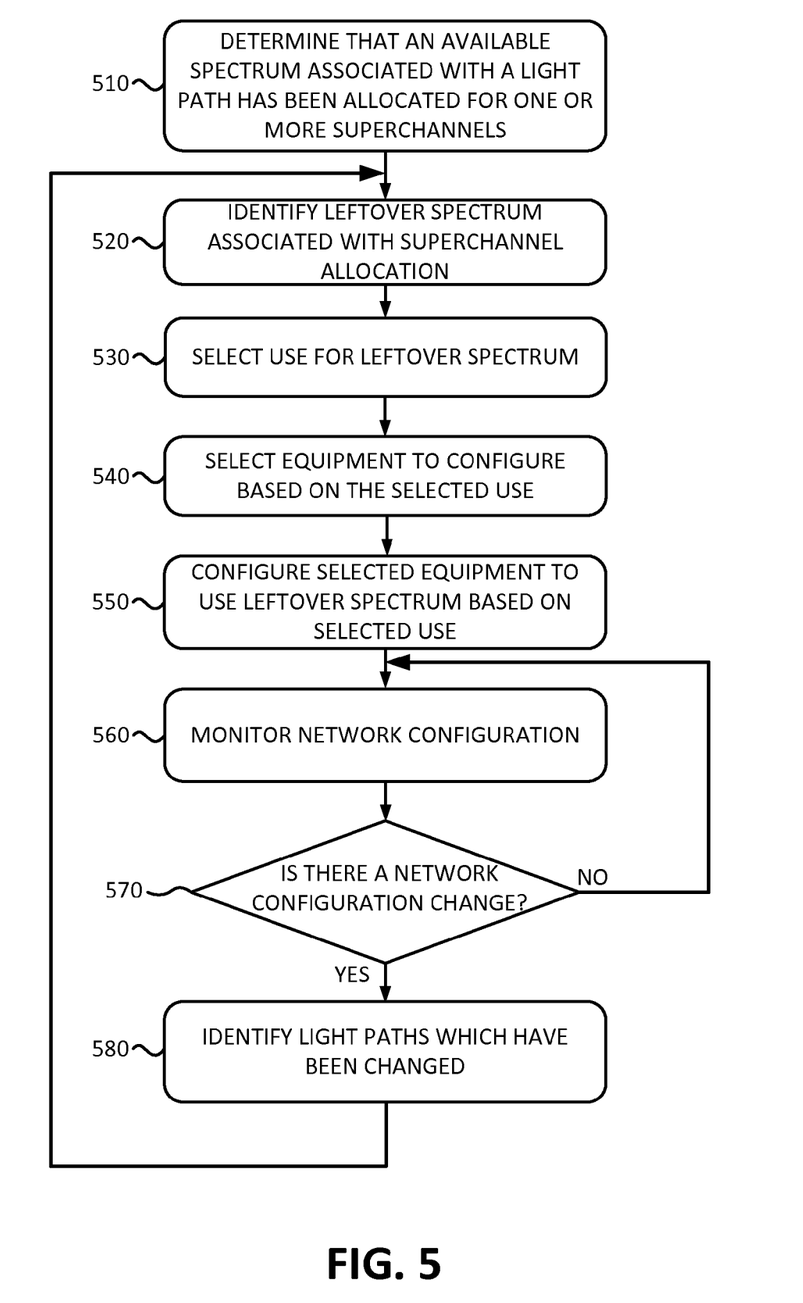
FIG. 5 is a flow chart of an exemplary process for using a leftover spectrum, when superchannels are allocated, according to an implementation described herein.

FIG. 5 is a flow chart of an exemplary process for using a leftover spectrum, when superchannels are allocated, according to an implementation described herein. In one implementation, the process of FIG. 5 may be performed by leftover spectrum system 130. In other implementations, some or all of the process of FIG. 5 may be performed by another device or a group of devices separate from leftover spectrum system 130 and/or including leftover spectrum system 130.

The process of FIG. 5 may include determining that an available spectrum associated with a light path has been allocated for one or more superchannels (block 510). As an example, superchannel system 120 may send information relating to a superchannel allocation to leftover spectrum system 130 and light paths monitor 420 may store the information in light paths database 430. As another example, light paths monitor 420 may monitor ROADM 110 for superchannel allocation. A leftover spectrum associated with the superchannel allocation may be identified (block 520). For example, light paths monitor 420 may calculate a leftover spectrum for a particular optically switched light path based on the available spectrum and based on the bandwidth of the available spectrum taken up by the allocated superchannels.

A use for the leftover spectrum may be selected (block 530). For example, leftover spectrum use selector 440 may select a particular use for the leftover spectrum based on one or more criteria. In one implementation, the particular use may be selected based on equipment associated with leftover spectrum system 130. For example, if leftover spectrum system 130 includes a network management system, leftover spectrum use selector 440 may select to use the leftover spectrum as a network management channel. As another example, if leftover spectrum system 130 includes OFDM equipment, leftover spectrum use selector 440 may select to use the leftover spectrum as an OFDM channel.

In another implementation, the particular use may be selected based on a particular type of superchannel allocation. For example, if the superchannel allocation includes multiple superchannels, each superchannel may be associated with a leftover spectrum. Thus, the available spectrum may include multiple distinct unused wavelength ranges. Leftover spectrum use selector 440 may select to use a flexible channel with a distributed spectral arrangement and may distribute a channel across the multiple distinct unused wavelength ranges.

Equipment to configure may be selected based on the selected use (block 540) and the selected equipment may be configured to use the leftover spectrum based on the selected use (block 550). As an example, leftover spectrum system controller 450 may select particular devices associated with the selected use (e.g., a particular port that is to generate an optical signal to be provided onto the leftover spectrum). As another example, ROADM controller 460 may configure one or more ROADMs 110 based on the selected use.

Network configuration may be monitored (block 560). For example, light paths monitor 420 may monitor the light path configuration of the network to determine whether a superchannel allocation associated with a light path has changed. A determination may be made as to whether the network configuration has changed (block 570). If it is determined that the network configuration has not changed (block 570—NO), processing may return to block 560 to continue to monitor the network configuration. If it is determined that the network configuration has changed (block 570—YES), light paths which have changed may be identified (block 580). For example, light paths monitor 420 may identify a particular light path for which the superchannel allocation has changed and processing may return to block 520 to identify a leftover spectrum associated with the changed superchannel allocation.

Figure 6:
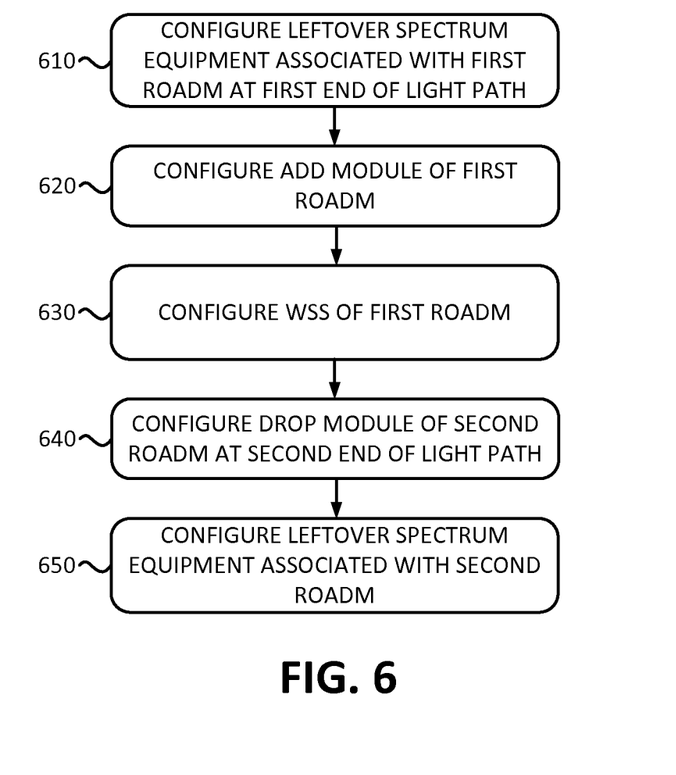
FIG. 6 is a flow chart of an exemplary process for configuring equipment to use a leftover spectrum according to an implementation described herein.

FIG. 6 is a flow chart of an exemplary process for configuring equipment to use a leftover spectrum according to an implementation described herein. In one implementation, the process of FIG. 6 may be performed by leftover spectrum system 130. In other implementations, some or all of the process of FIG. 6 may be performed by another device or a group of devices separate from leftover spectrum system 130 and/or including leftover spectrum system 130.

The process of FIG. 6 may include configuring leftover spectrum equipment associated with a first ROADM at a first end of a light path (block 610). For example, leftover spectrum system controller 450 may configure leftover spectrum system 130-A to transmit information associated with a selected channel. Furthermore, leftover spectrum system 130-A may configure a transceiver, such as a small form-factor (SFP) pluggable transceiver, to transmit an optical signal at a wavelength range associated with the leftover spectrum.

An add module of the first ROADM may be configured (block 620) and a WSS of the first ROADM may be configured (block 630). For example, ROADM controller 460 may configure add module 230 of ROADM 110-A to add the channel from leftover spectrum system 130-A to WSS 210 associated with the light path, associated with the leftover spectrum, and may configure the associated WSS 210 to add the channel to the light path.

A drop module of a second ROADM at a second end of the light path may be configured (block 640). For example, ROADM controller 460 may configure drop module 240 of ROADM 110-C to drop the channel from the light path. Leftover spectrum equipment associated with the second ROADM may be configured (block 650). For example, leftover spectrum system controller 450 may send a message to leftover spectrum system 130-B to configure leftover system 130-B to receive the channel associated with the leftover spectrum.

Figure 7:
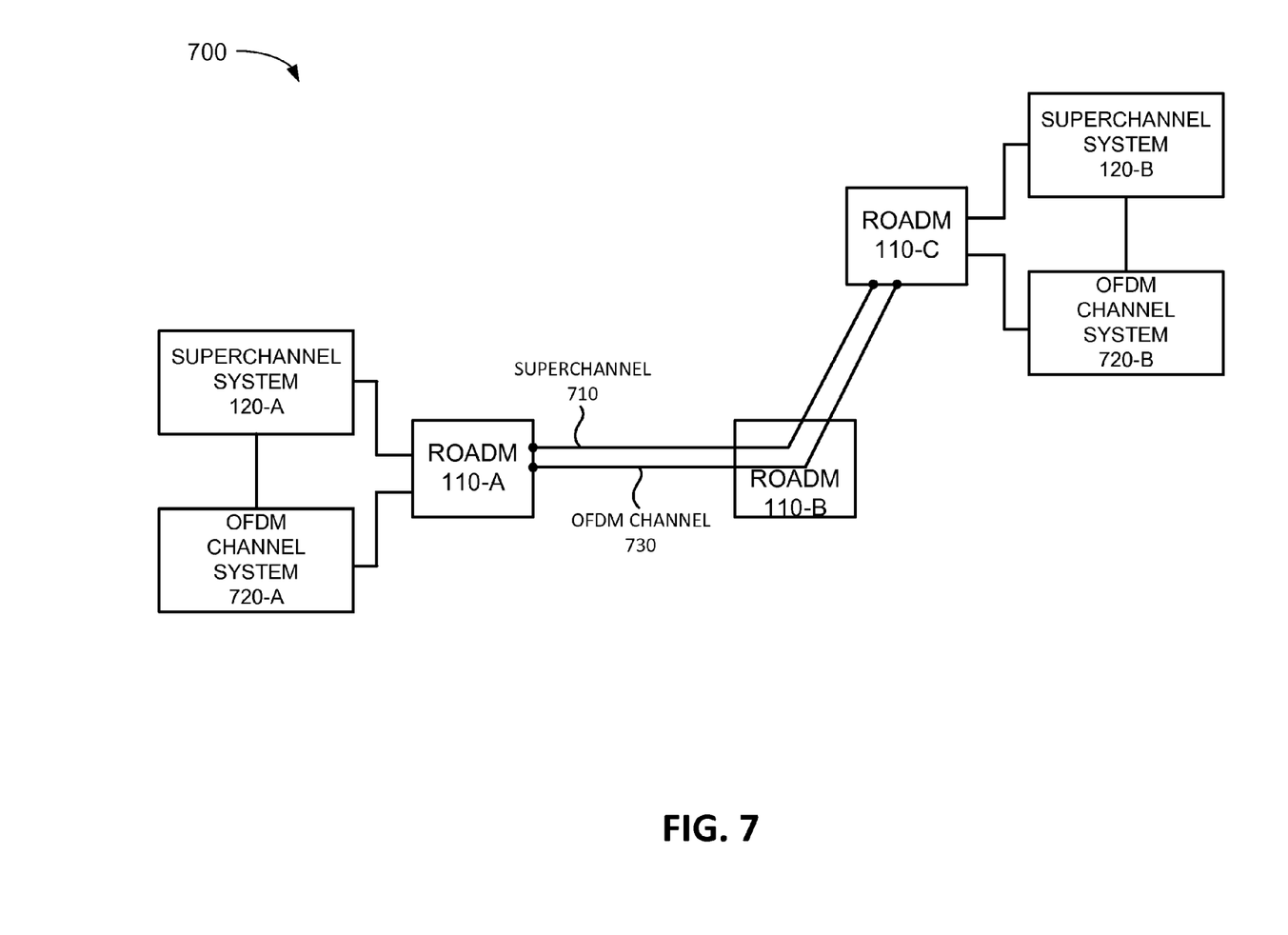
FIG. 7 is a diagram of a first example system according to an implementation described herein.

FIG. 7 is a diagram of a first example system 700 according to an implementation described herein. In system 700, superchannel system 120-A and superchannel system 120-B may exchange optical signals using superchannel 710. Furthermore, in system 700, leftover spectrum system 130-A may correspond to OFDM channel system 720-A and leftover spectrum system 130-B may correspond to OFDM channel system 720-B. OFDM channel system 720-A may select to use leftover spectrum, associated with a superchannel allocation generated by superchannel system 120-A, as an OFDM channel.

OFDM channel system 720 may include a network device, such as a switch or a router, to receive an electrical signal from a computer device, such as a server device. OFDM channel system 720 may convert the electrical signal into an OFDM optical signal in a wavelength range associated with a leftover spectrum using an optical signal generator, such as, for example, a small form-factor (SFP) pluggable transceiver. Thus, the light path from ROADM 110-A to ROADM 110-C may include superchannel 710, generated by superchannel system 120-A, and OFDM channel 730, generated by OFDM channel system 720-A.

Figure 8:
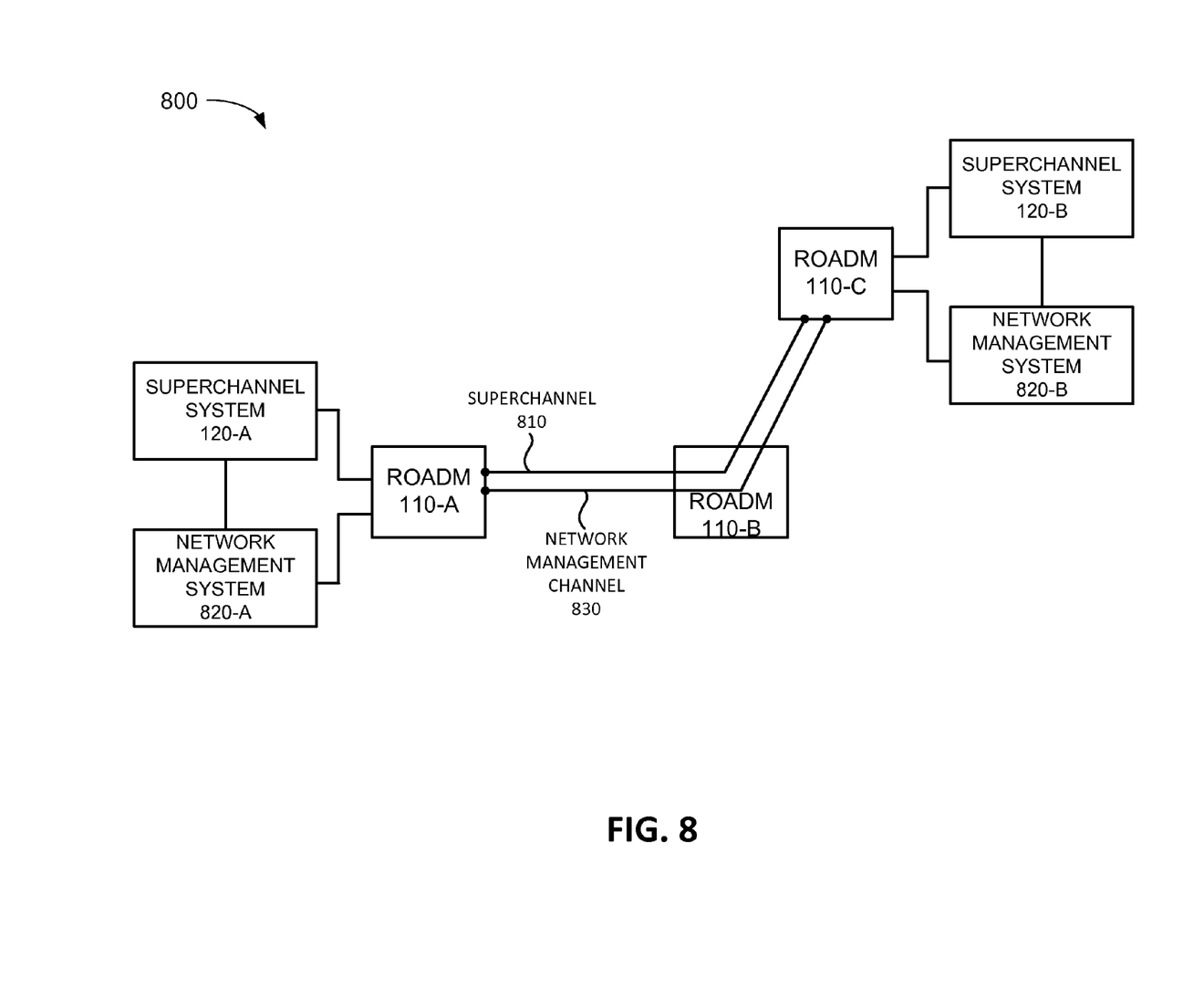
FIG. 8 is a diagram of a second example system according to an implementation described herein.

FIG. 8 is a diagram of a second example system 800 according to an implementation described herein. In system 800, superchannel system 120-A and superchannel system 120-B may exchange optical signals using superchannel 810. Furthermore, in system 800, leftover spectrum system 130-A may correspond to network management system 820-A and leftover spectrum system 130-B may correspond to network management system 820-B. Network management system 820-A may select to use leftover spectrum, associated with a superchannel allocation generated by superchannel system 120-A, as a network management channel.

Network management system 820 may include one or more network devices that perform control plane processing and/or network management for a network that includes ROADMs 110. Control plane processing may include, for example, network topology discovery and/or management; network address assignment; routing table management; forwarding table manipulation; quality of service (QoS) table manipulation; connection set up, teardown, and/or restoration; assignment of wavelength; traffic engineering; etc. Network management may include, for example, management of control plane resources; fault management; performance management; security management; accounting management; policy management; etc.

Network management system 820 may generate a control plane and/or a network management message, may convert the message into an optical signal in a wavelength range associated with a leftover spectrum using an optical signal generator, such as, for example, an SFP pluggable transceiver. Thus, the light path from ROADM 110-A to ROADM 110-C may include superchannel 810, generated by superchannel system 120-A, and network management channel 830, generated by network management system 820-A.

Figure 9:
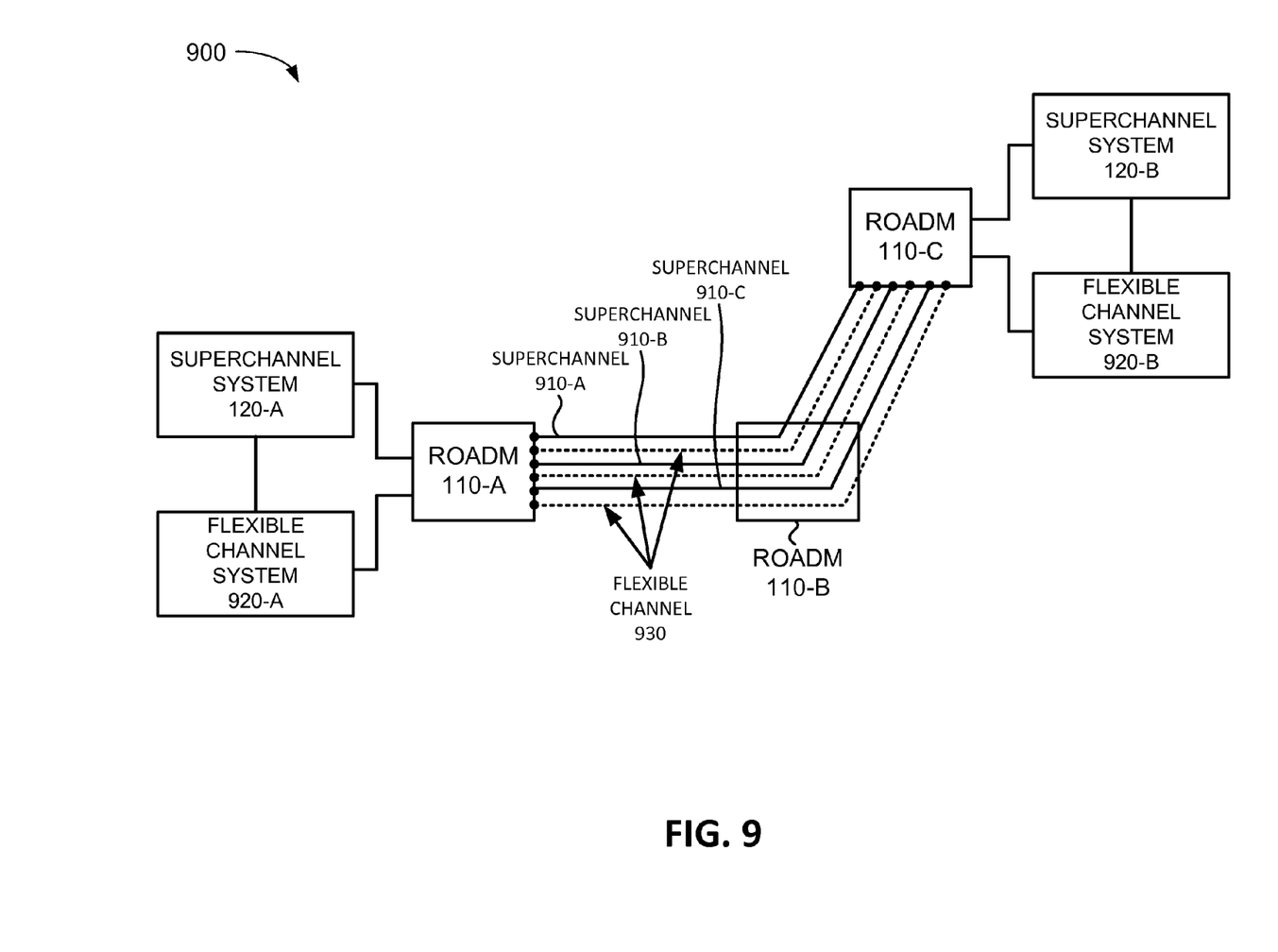
FIG. 9 is a diagram of a third example system according to an implementation described herein.

FIG. 9 is a diagram of a third example system 900 according to an implementation described herein. In system 900, superchannel system 120-A and superchannel system 120-B may exchange optical signals using a first superchannel 910-A, a second superchannel 910-B, and a third superchannel 910-C. Furthermore, in system 900, leftover spectrum system 130-A may correspond to a flexible channel system 920-A and leftover spectrum system 130-B may correspond to a flexible channel system 920-B. Each of the three superchannels 910 may be associated with a distinct leftover spectrum and flexible channel system 920-A may select to use a flexible channel 930 with a distributed spectral arrangement, in order to take advantage of the distinct leftover spectra.

Figure 10:
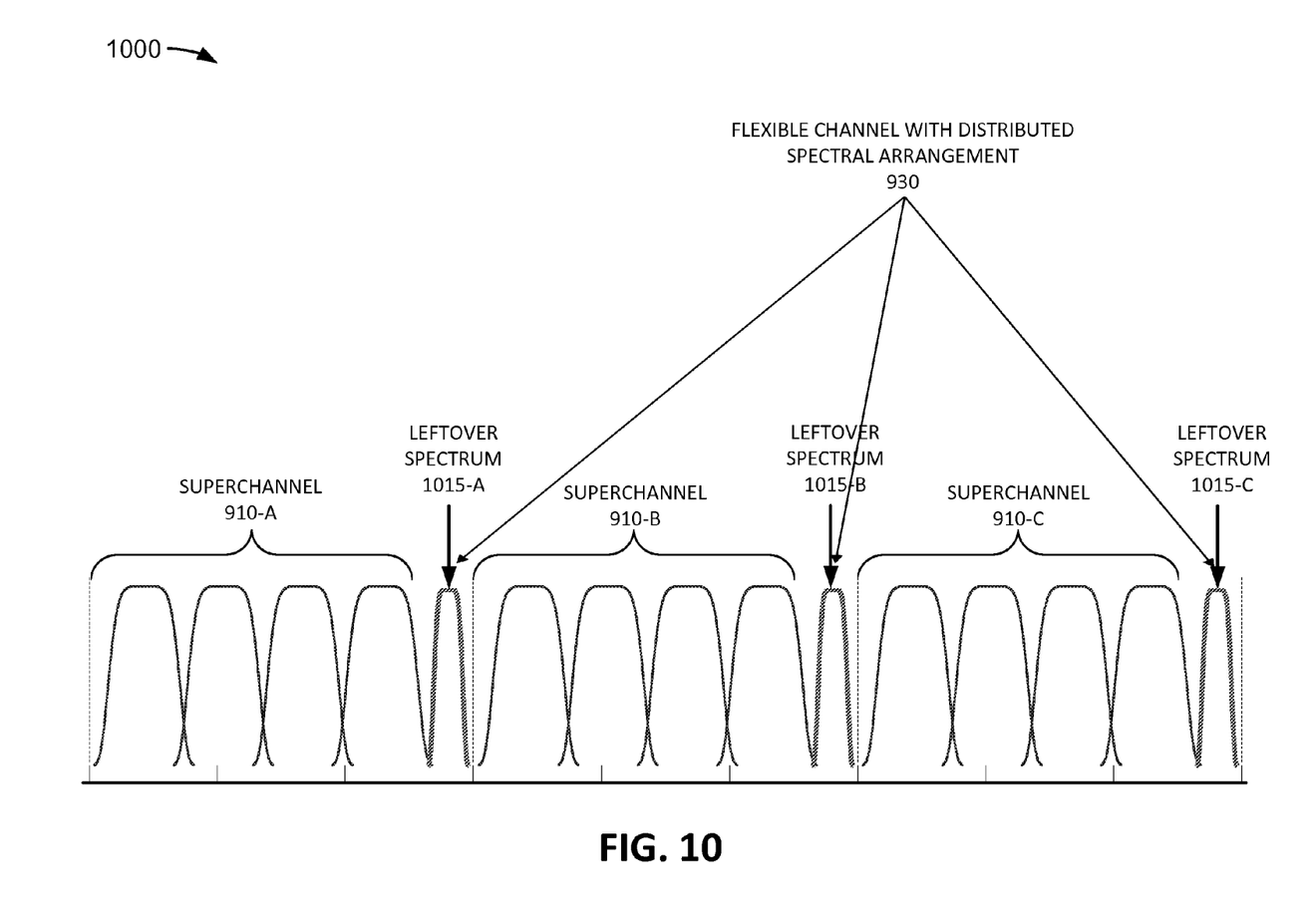
FIG. 10 is a diagram of a first example of spectrum allocation according to an implementation described herein.

FIG. 10 is a diagram of a first example of spectrum allocation 1000 that may be associated with system 900 of FIG. 9. Spectrum allocation may include first superchannel 910-A, second superchannel 910-B, and third superchannel 910-C. Each of the three superchannels may be associated with a leftover spectrum. First superchannel 910-A may be associated with first leftover spectrum 1015-A, second superchannel 910-B may be associated with second leftover spectrum 1015-B, and third superchannel 910-C may be associated with third leftover spectrum 1015-C. Spectrum allocation 1000 may include flexible channel 930 with distributed spectral arrangement, which may be distributed onto first leftover spectrum 1015-A, second leftover spectrum 1015-B, and third leftover spectrum 1015-C.

Flexible channel system 920-A may receive electrical signals associated with a data stream and may encode the electrical signals onto flexible channel 930. As an example, flexible channel system 920-A may encode bits into symbols and may send encoded symbols alternately via a first wavelength range associated with first leftover spectrum 1015-A, via a second wavelength range associated with second leftover spectrum 1015-B, and via a third wavelength range associated with third leftover spectrum 1015-C. Thus, optical signals may be distributed onto the leftover spectra through time division multiplexing. As another example, each time a new frame is to be transmitted, the information to be transmitted via flexible channel 930 may be distributed into three frames, each associated with one of the leftover spectra, and the three frames may be transmitted at a substantially same time.

Figure 11:
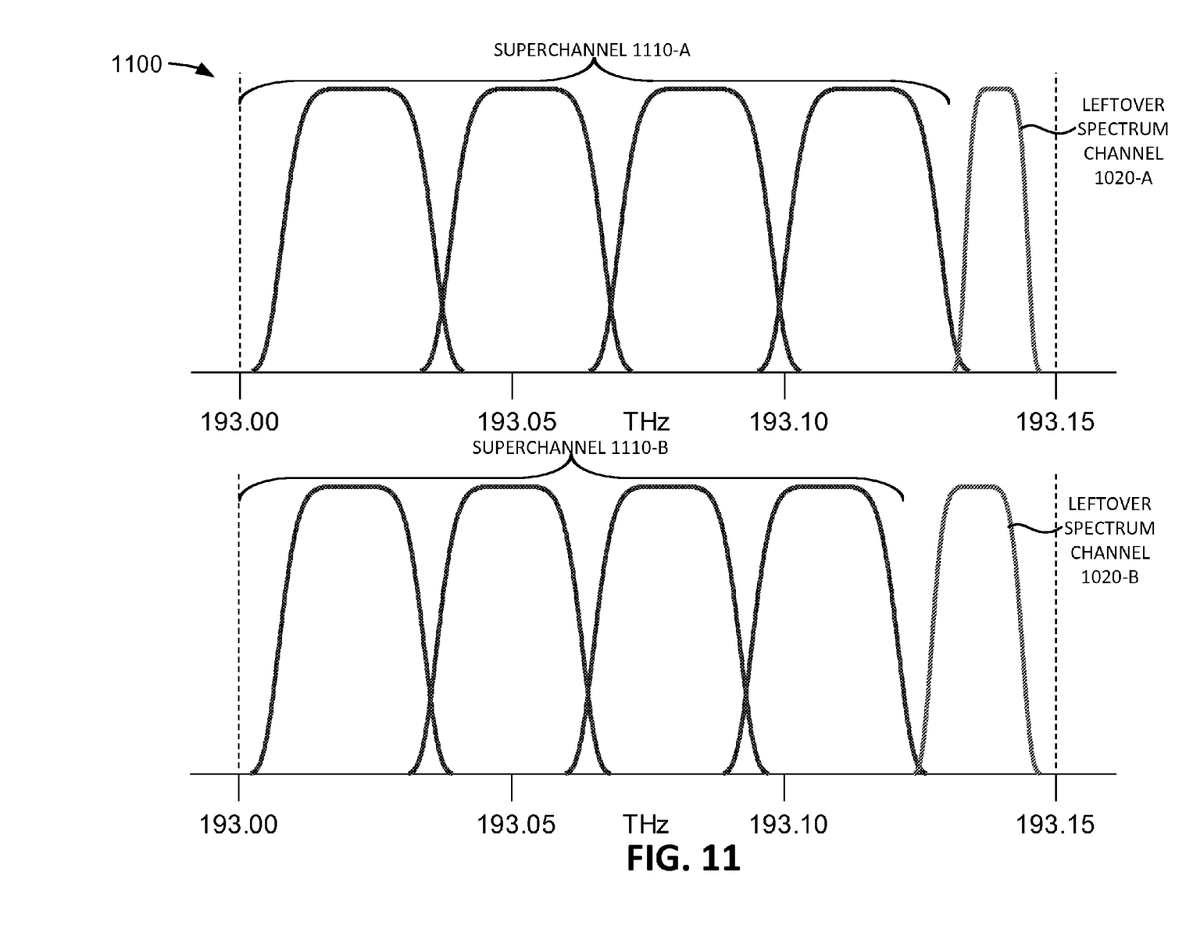
FIG. 11 is a diagram of a second example of spectrum allocation according to an implementation described herein.

FIG. 11 is a diagram of a second example of spectrum allocation 1100 according to an implementation described herein. Spectrum allocation 1100 may change in response to a change in the superchannel allocation. For example, during a first time period, the superchannel allocation may include first superchannel 1110-A may leave a leftover spectrum of 8 GHz. Thus, during the first time period, leftover spectrum channel 1020-A may be configured with a bandwidth of 8 GHz. During a second time period, the superchannel allocation may change to include second superchannel 1110-B, which may leave a leftover spectrum of 15 GHz. Thus, during the second time period, configuration of the leftover spectrum channel may change to leftover spectrum channel 1020-B, which may include a bandwidth of 15 GHz.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5 and 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a network device, the method comprising:
    determining, by the network device, that an available spectrum, associated with an optically switched light path, has been allocated for one or more superchannels;
    calculating, by the network device, a leftover spectrum associated with the allocated one or more superchannels based on the available spectrum and based on a bandwidth used by the allocated one or more superchannels;
    selecting, by the network device, a use for the leftover spectrum;
    selecting, by the network device, one or more devices to configure based on the selected use, wherein the selected one or more devices include:
        a first leftover spectrum device, associated with a first reconfigurable optical add drop multiplexer associated with a first end of the optically switched light path, and configured to provide data for the leftover spectrum via a channel within the leftover spectrum, and
        a second leftover spectrum device, associated with a second reconfigurable optical add drop multiplexer associated with a second end of the optically switched light path, and configured to receive the data via the channel within the leftover spectrum;
    configuring, by the network device, the selected one or more devices to use the leftover spectrum, wherein the configuring includes:
        configuring an add module of the first reconfigurable optical add drop multiplexer to add the channel within the leftover spectrum to the optically switched light path, and
        configuring a wavelength selectable switch of the first reconfigurable optical add drop multiplexer to add the channel within the leftover spectrum onto the leftover spectrum of the optically switched light path; and
    sending, by the network device, the data via the channel within the leftover spectrum using the configured one or more devices.

2. The method of claim 1, further comprising:
    monitoring the optically switched light path for a change in allocation of the available spectrum;
    determining that the allocation of the available spectrum has changed; and
    repeating the calculating the leftover spectrum associated with the allocated one or more superchannels, the selecting a use for the leftover spectrum, the selecting the one or more devices to configure, and the configuring the selected one or more devices to use the leftover spectrum, based on determining that the allocation of the available spectrum has changed.

3. The method of claim 1, wherein the configuring the selected one or more devices to use the leftover spectrum further includes:
    configuring a drop module of the second reconfigurable optical add drop multiplexer to drop the channel within the leftover spectrum from the leftover spectrum of the optically switched light path, and
    configuring another device associated with the second leftover spectrum device to receive the data via channel within the leftover spectrum.

4. The method of claim 1, wherein selecting the use for the leftover spectrum includes selecting a data channel, wherein selecting the one or more devices to configure includes selecting a data channel device associated with the data channel, and wherein configuring the selected one or more devices further includes configuring the data channel device to convert data from the data channel from an electrical signal into an optical signal in a wavelength range associated with the leftover spectrum.

5. The method of claim 4, wherein the data channel includes an orthogonal frequency division multiplexing channel.

6. The method of claim 1, wherein selecting the use for the leftover spectrum includes selecting a network management channel, wherein selecting the one or more devices to configure includes selecting a network management device associated with the network management channel, and wherein configuring the selected one or more devices further includes configuring the network management device to generate a network management command and convert the network management command into an optical signal in a wavelength range associated with the leftover spectrum.

7. The method of claim 1, wherein determining that the available spectrum, associated with the optically switched light path, has been allocated for one or more superchannels includes:
    determining that the available spectrum, associated with the optically switched light path, has been allocated for a first superchannel, wherein the first superchannel is associated with a first portion of the leftover spectrum; and determining that the available spectrum, associated with the optically switched light path, has been allocated for a second superchannel, wherein the second superchannel is associated with a second portion of the leftover spectrum, wherein a wavelength range associated with the second superchannel is between a wavelength range associated with the first portion and a wavelength range associated with the second portion;
wherein selecting the use for the leftover spectrum includes:
selecting to distribute a data channel across at least the first portion and the second portion;
wherein selecting the one or more devices to configure includes:
selecting a data channel device associated with the data channel; and
wherein configuring the selected one or more devices to use the leftover spectrum includes:
configuring the data channel device to convert data from the data channel from an electrical signal into an optical signal in the wavelength range associated with the first portion and an optical signal in the wavelength range associated with the second portion.

8. The method of claim 1, further comprising:
detecting that a wavelength range associated with the leftover spectrum has increased or decreased; and
adjusting a configuration associated with the selected one or more devices based on detecting that the wavelength range associated with the leftover spectrum has increased or decreased.

9. A system comprising:
a computer device configured to:
determine that an available spectrum, associated with an optically switched light path, has been allocated for one or more superchannels;
calculate a leftover spectrum associated with the allocated one or more superchannels based on the available spectrum and based on a bandwidth used by the allocated one or more superchannels;
select a use for the leftover spectrum;
select one or more devices to configure based on the selected use, wherein the selected one or more devices include:
a first leftover spectrum device, associated with a first reconfigurable optical add drop multiplexer associated with a first end of the optically switched light path, and configured to provide data for the leftover spectrum via a channel within the leftover spectrum, and
a second leftover spectrum device, associated with a second reconfigurable optical add drop multiplexer associated with a second end of the optically switched light path, and configured to receive the data via the channel within the leftover spectrum;
configure the selected one or more devices to use the leftover spectrum, including:
configuring an add module of the first reconfigurable optical add drop multiplexer to add the channel within the leftover spectrum to the optically switched light path, and
configuring a wavelength selectable switch of the first reconfigurable optical add drop multiplexer to add the channel within the leftover spectrum onto the leftover spectrum of the optically switched light path; and
send data via the channel within the leftover spectrum using the configured one or more devices.

10. The system of claim 9, wherein the computer device is further configured to:
monitor the optically switched light path for a change in allocation of the available spectrum;
determine that the allocation of the available spectrum has changed; and
repeat the calculating the leftover spectrum associated with the associated with the allocated one or more superchannels, the selecting a use for the leftover spectrum, the selecting the one or more devices to configure, and the configuring the selected one or more devices to use the leftover spectrum, based on determining that the allocation of the available spectrum has changed.

11. The system of claim 9, wherein the computer device is further configured to:
configure a drop module of the second reconfigurable optical add drop multiplexer to drop the channel within the leftover spectrum from the leftover spectrum of the optically switched light path, and
configure another device associated with the second leftover spectrum device to receive the data via the channel within the leftover spectrum.

12. The system of claim 9, wherein the computer device is further configured to:
select a data channel;
select a data channel device associated with the data channel; and
configure the data channel device to convert data from the data channel from an electrical signal into an optical signal in a wavelength range associated with the leftover spectrum.

13. The system of claim 9, wherein the computer device is further configured to:
select a network management channel;
select a network management device associated with the network management channel; and
configure the network management device to generate a network management command and convert the network management command into an optical signal in a wavelength range associated with the leftover spectrum.

14. The system of claim 9, wherein the computer device is further configured to:
determine that the available spectrum, associated with the optically switched light path, has been allocated for a first superchannel, wherein the first superchannel is associated with a first portion of the leftover spectrum;
determine that the available spectrum, associated with the optically switched light path, has been allocated for a second superchannel, wherein the second superchannel is associated with a second portion of the leftover spectrum, wherein a wavelength range associated with the second superchannel is between a wavelength range associated with the first portion and a wavelength range associated with the second portion;
select to distribute a data channel across at least the first portion and the second portion;
select a data channel device associated with the data channel; and
configure the data channel device to convert data from the data channel from an electrical signal into an optical signal in the wavelength range associated with the first portion and an optical signal in the wavelength range associated with the second portion.

15. A non-transitory computer-readable medium, storing instructions executable by one or more processors, the non-transitory computer-readable medium including:

one or more instructions to determine that an available spectrum, associated with an optically switched light path, has been allocated for one or more superchannels;

one or more instructions to calculate a leftover spectrum associated with the allocated one or more superchannels based on the available spectrum and based on a bandwidth used by the allocated one or more superchannels;

one or more instructions to select a use for the leftover spectrum;

one or more instructions to select one or more devices to configure based on the selected use, wherein the selected one or more devices include:
- a first leftover spectrum device, associated with a first reconfigurable optical add drop multiplexer associated with a first end of the optically switched light path, and configured to provide data for the leftover spectrum via a channel within the leftover spectrum, and
- a second leftover spectrum device, associated with a second reconfigurable optical add drop multiplexer associated with a second end of the optically switched light path, and configured to receive the data via the channel within the leftover spectrum;

one or more instructions to configure the selected one or more devices to use the leftover spectrum, including:
- configuring an add module of the first reconfigurable optical add drop multiplexer to add the channel within the leftover spectrum to the optically switched light path, and
- configuring a wavelength selectable switch of the first reconfigurable optical add drop multiplexer to add the channel within the leftover spectrum onto the leftover spectrum of the optically switched light path; and one or more instructions to send data via the channel within the leftover spectrum using the configured one or more devices.

16. The non-transitory computer-readable medium of claim 15, further comprising:
- one or more instructions to select a data channel;
- one or more instructions to select a data channel device associated with the data channel; and
- one or more instructions to configure the data channel device to convert data from the data channel from an electrical signal into an optical signal in a wavelength range associated with the leftover spectrum.

17. The non-transitory computer-readable medium of claim 15, further comprising:
- one or more instructions to select a network management channel;
- one or more instructions to select a network management device associated with the network management channel; and
- one or more instructions to configure the network management device to generate a network management command and convert the network management command into an optical signal in a wavelength range associated with the leftover spectrum.

18. The non-transitory computer-readable medium of claim 15, further comprising:
- one or more instructions to determine that the available spectrum, associated with the optically switched light path, has been allocated for a first superchannel, wherein the first superchannel is associated with a first portion of the leftover spectrum;
- one or more instructions to determine that the available spectrum, associated with the optically switched light path, has been allocated for a second superchannel, wherein the second superchannel is associated with a second portion of the leftover spectrum, wherein a wavelength range associated with the second superchannel is between a wavelength range associated with the first portion and a wavelength range associated with the second portion;
- one or more instructions to select to distribute a data channel across at least the first portion and the second portion;
- one or more instructions to select a data channel device associated with the data channel; and
- one or more instructions to configure the data channel device to convert data from the data channel from an electrical signal into an optical signal in the wavelength range associated with the first portion and an optical signal in the wavelength range associated with the second portion.

19. The non-transitory computer-readable medium of claim 15, further comprising:
- one or more instructions to configure a drop module of the second reconfigurable optical add drop multiplexer to drop the channel within the leftover spectrum from the leftover spectrum of the optically switched light path, and
- one or more instructions to configure another device associated with second leftover spectrum device to receive data via the channel within the leftover spectrum.

20. The non-transitory computer-readable medium of claim 15, wherein the channel within the leftover spectrum comprises a flexible channel with a distributed spectral arrangement.

* * * * *